United States Patent
Upadhyayula et al.

(10) Patent No.: US 7,080,058 B1
(45) Date of Patent: Jul. 18, 2006

(54) MANAGING DYNAMIC DEVICE COLOR PROFILES

(75) Inventors: Usha Upadhyayula, Chandler, AZ (US); Yap-Peng Tan, Chandler, AZ (US); Mannan Mohammed, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/105,844

(22) Filed: Jun. 26, 1998

(51) Int. Cl.
*G06F 17/30* (2006.01)

(52) U.S. Cl. ...................................... 707/1; 348/207.2

(58) Field of Classification Search ................ 386/177; 348/372, 552, 207.99, 207.2, 207.1; 345/154, 345/522; 707/104.1; 358/518, 1.1, 1.6, 358/1.9; 382/162, 167; 347/2
See application file for complete search history.

(56) References Cited

U.S. PATENT DOCUMENTS

| | | | | |
|---|---|---|---|---|
| 5,298,993 A | * | 3/1994 | Edgar et al. | 348/180 |
| 5,550,646 A | * | 8/1996 | Hassan et al. | 358/442 |
| 5,694,227 A | * | 12/1997 | Starkweather | 358/504 |
| 5,739,809 A | * | 4/1998 | McLaughlin et al. | 345/594 |
| 5,806,081 A | * | 9/1998 | Swen et al. | 707/528 |
| 5,818,525 A | * | 10/1998 | Elabd | 348/268 |
| 5,881,209 A | * | 3/1999 | Stokes | 395/109 |
| 5,956,044 A | * | 9/1999 | Giorgianni et al. | 345/590 |
| 5,982,416 A | * | 11/1999 | Ishii et al. | 348/29 |
| 6,075,888 A | * | 6/2000 | Schwartz | 382/167 |
| 6,088,038 A | * | 7/2000 | Edge et al. | 345/150 |
| 6,151,134 A | * | 11/2000 | Deppa et al. | 358/1.15 |
| 6,226,011 B1 | * | 5/2001 | Sakuyama et al. | 345/600 |
| 6,236,464 B1 | * | 5/2001 | Kohtani et al. | 358/1.15 |
| 6,268,930 B1 | * | 7/2001 | Ohta et al. | 358/109 |
| 6,273,535 B1 | * | 8/2001 | Inoue et al. | 347/3 |
| 6,283,858 B1 | * | 9/2001 | Hayes, Jr. et al. | 463/31 |
| 6,307,961 B1 | * | 10/2001 | Balonon-Rosen et al. | 382/167 |
| 6,337,922 B1 | * | 1/2002 | Kumada | 382/162 |
| 6,445,461 B1 | * | 9/2002 | Ozawa et al. | 358/1.6 |
| 6,477,318 B1 | * | 11/2002 | Ishii | 386/95 |
| 6,493,028 B1 | * | 12/2002 | Anderson et al. | 348/231.6 |
| 6,504,950 B1 | * | 1/2003 | Murashita et al. | 382/162 |

OTHER PUBLICATIONS

ICC Profile Format Specification Version 3.4—Aug. 15, 1997, International Color Consortium, Copyright 1994-1997, International Color Consortium.

* cited by examiner

*Primary Examiner*—Tim Vo
*Assistant Examiner*—Haythim Alaubaidi
(74) *Attorney, Agent, or Firm*—Trop, Pruner & Hu, P.C.

(57) ABSTRACT

Device information is extracted from a graphical object's data file to dynamically generate a profile suitable for processing by a color management system. In one embodiment, the graphical object is an image and the graphical object's data file is generated by a digital camera.

19 Claims, 6 Drawing Sheets

MANAGING DYNAMIC DEVICE COLOR PROFILES

BACKGROUND

The invention relates generally to the use of device color profiles used by image color management systems.

One goal of image color management technology is to ensure that a color image, graphic, or text object (hereinafter collectively referred to as graphical objects) is rendered as close as possible to its original intent on any device, despite differences in imaging technologies and color capabilities between devices. To achieve this goal, color characteristics of devices such as scanners, printers, and display monitors may be determined a priori and encapsulated in a device profile.

A device profile is a file that contains information about how to convert colors in the color space of a specific input device (e.g., a scanner) into a device-independent color space, or from a device independent color space into an output device's color space. Typical input and output device color spaces include the red-green-blue (RGB) and cyan-magenta-yellow-black (CMYK) color spaces. One illustrative device-independent or profile color space (PCS) is the Commission Internationale de lÉclairage (CIE) XYZ color space. (See Commission Internationale de lÉclairage Publication 15.2-1986, "Colorimetry, Second Edition.")

Figure 1:
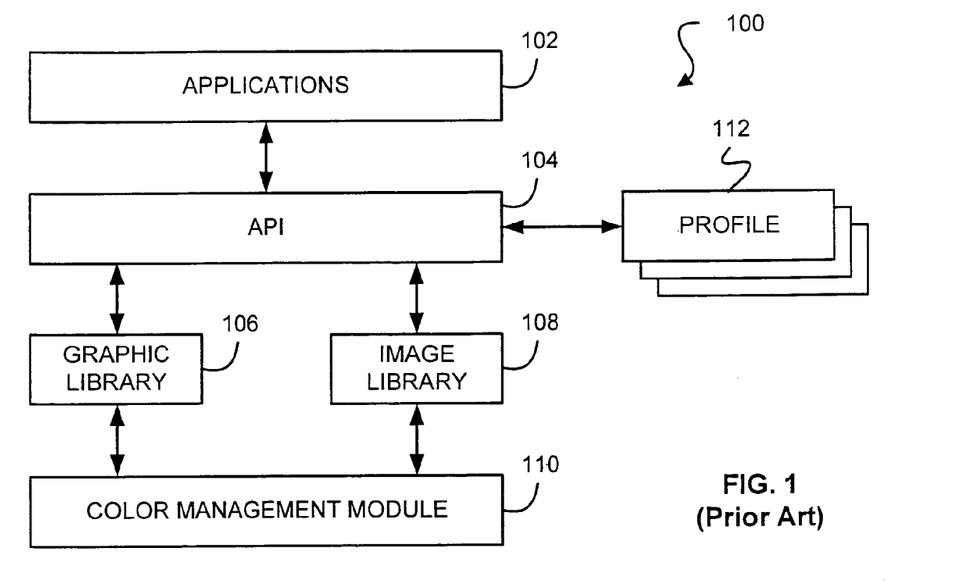
FIG. 1 shows a computer system using color management and device profiles to process graphical objects.

Referring to FIG. 1, computer system 100 may include one or more graphical applications 102 that can be used to view and/or modify graphical objects generated by a device such as a digital scanner. Applications 102 may communicate with color management module (CMM) 110, through application programming interface (API) 104 and graphics 106 and imaging 108 libraries. Profiles 112 may provide CMM 110 with information about how to convert colors into and out of device color spaces. For example, if the input device is a color scanner, a first profile may provide CMM 110 with information needed to convert the scanner's input color space (e.g., the red-green-blue, RGB) into the PCS. A second profile may provide the necessary information for CMM 110 to convert the PCS into a suitable output color space such as for viewing on a display monitor. One example output color space is the sRGB color space as described in version 1.10 of the document entitled "A Standard Default Color Space for the Internet—sRGB," published by members of Hewlett-Packard Company and Microsoft Incorporated in 1996.

Input and output device profiles 112 are typically created by device manufacturers or third party vendors and may comprise one, or a few different profiles—where each profile may accommodate different input and output color spaces. In an environment in which one, or at most a few, profiles for each device can be determined a priori, the above described color management scheme may work reasonably well. In an environment in which graphical objects may be subject to a variety of different capture environments (such as images generated by a digital camera), however, a single a priori device profile cannot provide good color reproduction for the different capture environments. Thus, it would be beneficial to provide a technique (apparatus and method) to generate color profiles for graphical objects in a dynamic or automatic fashion.

SUMMARY

In one embodiment the invention provides a method and apparatus to dynamically generate device profiles. These embodiments may include receiving a graphical object having associated profile information, generating a profile based on the associated profile information, and identifying the profile to a color management system. The method may include generating a new graphical object, from the received graphical object, that has had its profile information removed. The act of identifying the profile may include associating a filename with the profile and communicating the filename to the color management system, perhaps via an application programming interface function call. The method may further include communicating the graphical object to the color management system.

In another embodiment, a method and apparatus to distinguish between a newly received graphical object's profile information and prior received profile information is provided. In these embodiments, if the newly received graphical object's associated profile information is not equivalent to prior received profile information, a new profile is created and identified to the color management system. Equivalence may be determined by comparing profile attribute values such as measurement tag values, and/or illuminant tag values, and/or rendering intents values.

Methods in accordance with the invention may be stored in any media that is readable and executable by a computer system. Illustrative media include: semiconductor memory devices such as EPROM, EEPROM, and flash devices; magnetic disks (fixed, floppy, and removable); other magnetic media such as tape; and optical media such as CD-ROM disks. Further, methods in accordance with the invention may be embodied in a hardware device such as a printed circuit board comprising discrete logic, integrated circuits, or specially designed application specific integrated circuits (ASIC).

DETAILED DESCRIPTION

Techniques (including methods and devices) to dynamically generate device profiles are described. The following embodiments of this inventive concept are illustrative only and are not to be considered limiting in any respect.

Figure 2:
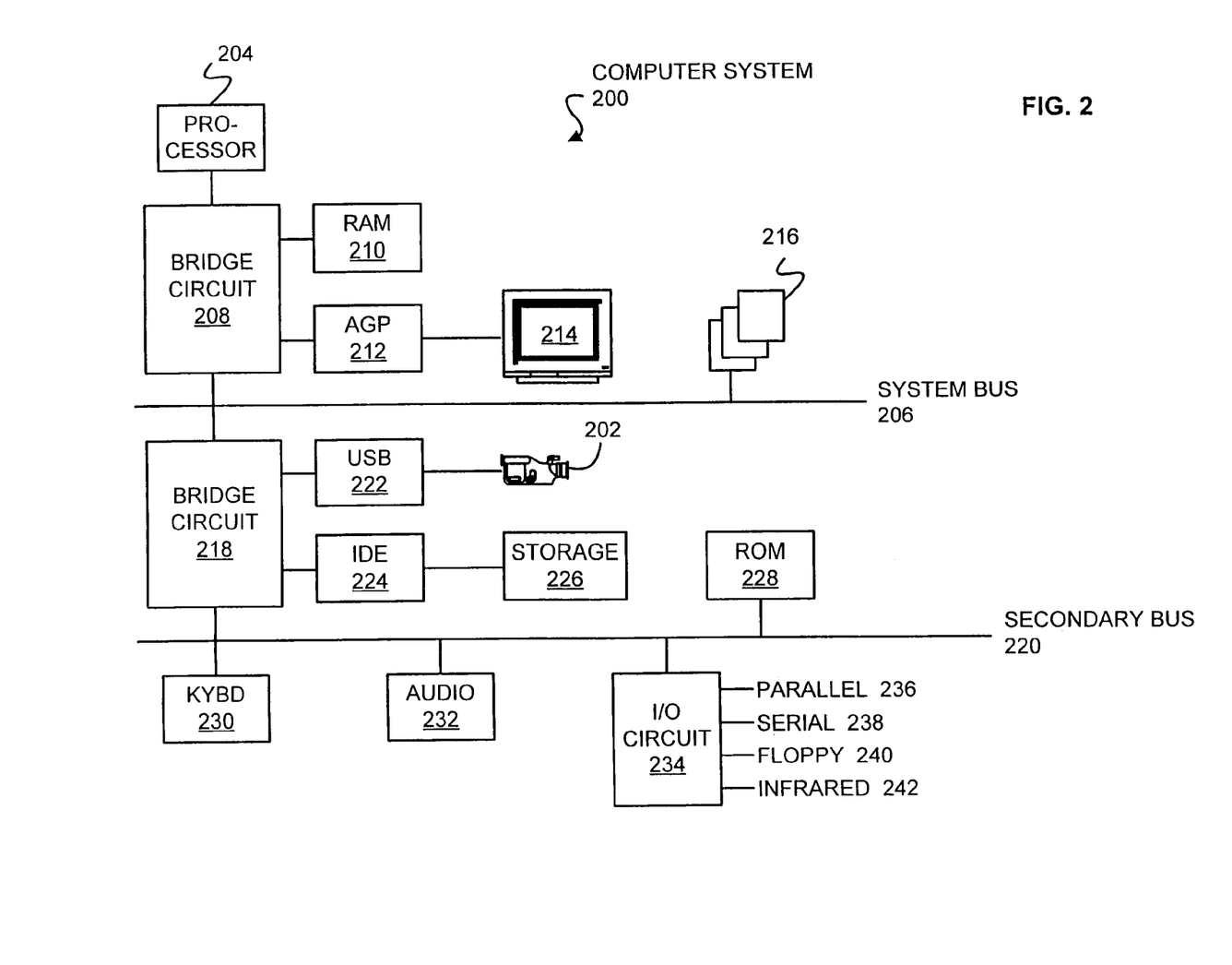
FIG. 2 shows a computer system and graphical object capture device in accordance with one embodiment of the invention.

Referring to FIG. 2, a representative computer system 200 for use with digital camera 202 is shown. Computer system 200 includes processor 204 coupled to system bus 206 through bridge circuit 208. Illustrative host processors 204 include the PENTIUM® family of processors and the 80X86 families of processors from Intel Corporation. One illustrative bridge circuit 208 is the 82443LX PCI-to-AGP controller manufactured by Intel Corporation.

Bridge circuit 208 provides an interface for system random access memory (RAM) 210, accelerated graphics port (AGP) 212 devices such as display unit 214, and one or more expansion slots 216. Expansion slots 216 may be personal computer memory card international association (PCMCIA) slots.

Bridge circuit 218 may also couple system bus 206 to secondary bus 220, while also providing universal serial bus (USB) 222 and integrated device electronics (IDE) 224 interfaces. Common IDE devices include magnetic and optical storage units 226. Also coupled to secondary bus 220 may be system read only memory (ROM) 228, keyboard controller (KYBD) 230, audio device 232, and input-output (I/O) circuit 234. One illustrative bridge circuit 218 is the 82371AB PCI-to-ISA/IDE controller manufactured by Intel Corporation. Input-output circuit 234 may provide an interface for parallel 236 and serial 238 ports, floppy disk drives 240, and infrared ports 242.

Camera 202 may associate (e.g., store) profile information with each image at the time the image is captured. The associated profile information may include profile information in accordance with the International Color Consortium's (ICC's) profile format specification, version 3.4, August 1997. Thus, an image file generated by camera 202 may have the structure shown in FIG. 3: a first portion comprising profile information 300 and a second portion comprising image data 302. Profile information 300, in turn, may comprise profile header information 304, tag information table of contents 306, and tag table data 308 in accordance with the aforementioned ICC profile format specification. In an embodiment where camera 202 is an RGB device and the profile color space (PCS) is the CIE XYZ color space, the ICC profile format specification stipulates that tag table 308 comprise some of the tags enumerated in Table 1. While other device and profile color spaces may be used, for brevity, only RGB and XYZ color spaces will be discussed herein.

TABLE 1

Illustrative Profile Tag Table Entries

| Tag Name | Description |
|---|---|
| redColorantTag | Red colorant XYZ relative tristimulus value. |
| greenColorantTag | Green colorant XYZ relative tristimulus value. |
| blueColorantTag | Blue colorant XYZ relative tristimulus value. |
| redTRCTag | Red channel tone reproduction curve. |
| greenTRCTag | Green channel tone reproduction curve. |
| blueTRCTag | Blue channel tone reproduction curve. |
| mediaWhitePointTag | Media XYZ white point. |

Figure 3:
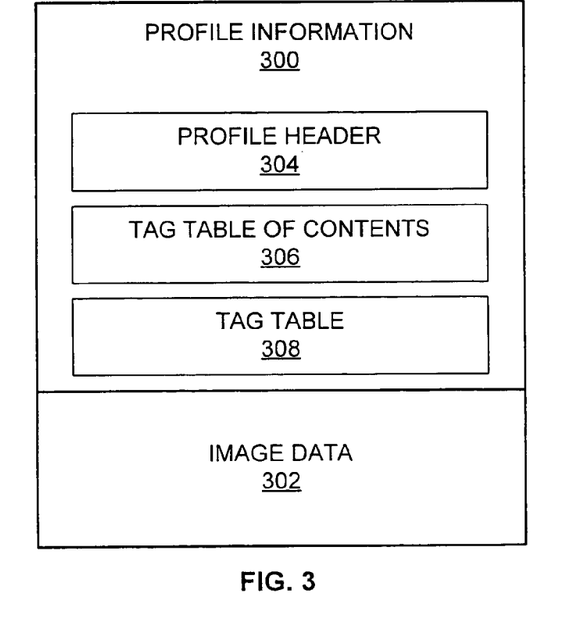
FIG. 3 shows an image file format in accordance with one embodiment of the invention.

Measurement tags redColorantTag, greenColorantTag, and blueColorantTag represent the relative XYZ values of the input device's (e.g., camera 202) red, green, and blue colorants. Rendering intent information such as red, green, and blue tone reproduction curve (TRC) tags or attributes may be used by a color management module (CMM) to linearize RGB input and may be ignored if the input data is already linear. Illuminant tag information such as the mediaWhitePointTag may be used to record the XYZ (e.g., the PCS color space) values of the capture media's (e.g., digital "film") white point. Another illuminant tag that may be recorded by camera 202 and included in an image's profile information 300 is the viewingConditionsType and associated tag value. The viewingConditionsType attribute may record the illuminant condition under which an image is captured such as whether it was taken under daylight, tungsten, or fluorescent lighting conditions. (In one embodiment of the ICC profile format, the mediaWhitePointTag value is used for generating absolute colorimetry and is referenced to the PCS so that the media white point as represented in the PCS is equivalent to this tag value.) Because each image captured by camera 202 may be subject to a different illumination condition it is, in general, not possible to generate a color profile a priori that provides good color reproduction of the captured image. This is one distinguishing feature between a digital camera and other image capture devices such as digital scanners which have a substantially constant capture environment. The lack of certainty in describing an image's illuminant condition means that, without a means of generating a device profile based on the image itself, the ability of a color management system to render the image as close as possible to its original intent on any device, despite differences in imaging technologies and color capabilities between devices, is substantially limited.

Figure 4:
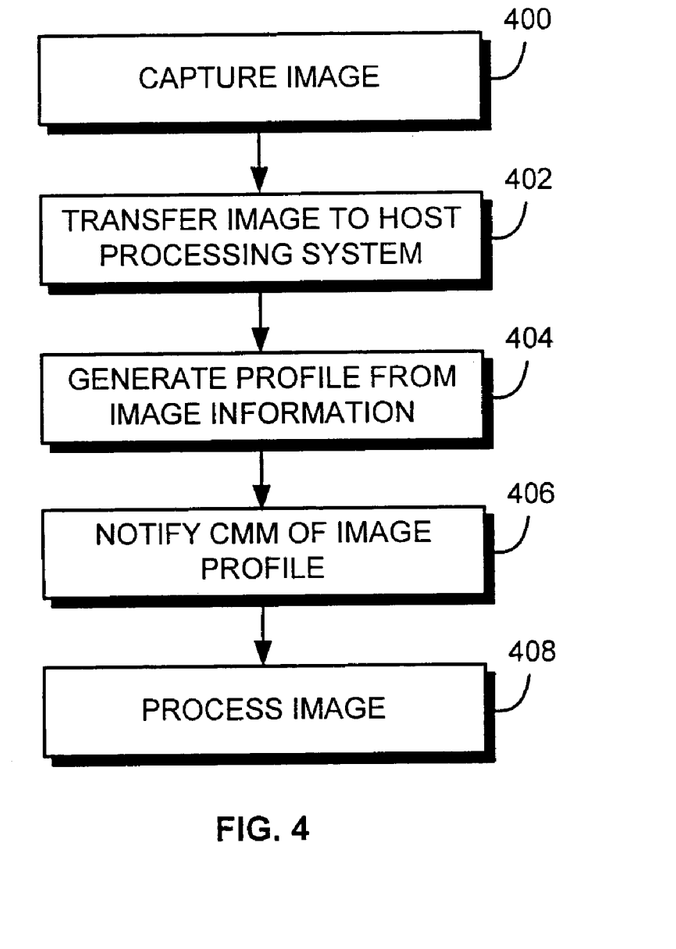
FIG. 4 shows a technique to generate and use device color profiles in accordance with one embodiment of the invention.

One method to dynamically generate a device profile is illustrated in FIG. 4. First, camera 202 captures an image in a file, including therein profile data in accordance with FIG. 3 and Table 1 (step 400). At some later time, the image file may be transferred to computer system 200 (step 402). Computer system 200 may then use the image file's profile information 300 portion to generate a profile file in accordance with the ICC profile specification (step 404). The dynamically generated profile is assigned a unique filename, and this filename is passed to the CMM (step 406). Notification, or identification of the dynamically generated profile's filename to the CMM may be accomplished in a number of ways such as through application programming interface (API) calls. Having a profile that accurately reflects the image's taking/capture conditions, the CMM can faithfully process the image in accordance with user instructions and the generated device profile (step 408).

In another embodiment, referred to herein as the "live" mode of operation, camera 202 is coupled to computer system 200 during image capture, periodically transferring captured images in an automated manner. By way of example, camera 202 may be coupled to computer system 200 via electrical cable, radio frequency or infrared transmission channels, and may transfer images to computer system 200 at a rate of up to approximately 30 images per second. The transfer may be initiated by computer system 200 or by camera 202. When camera 202 is coupled to computer system 200, the probability of successive images having different taking conditions is relatively small. Thus, when operating in the live mode, it may not be necessary to create a new profile for every image that is transferred from camera 202 to computer system 200.

Figure 5:
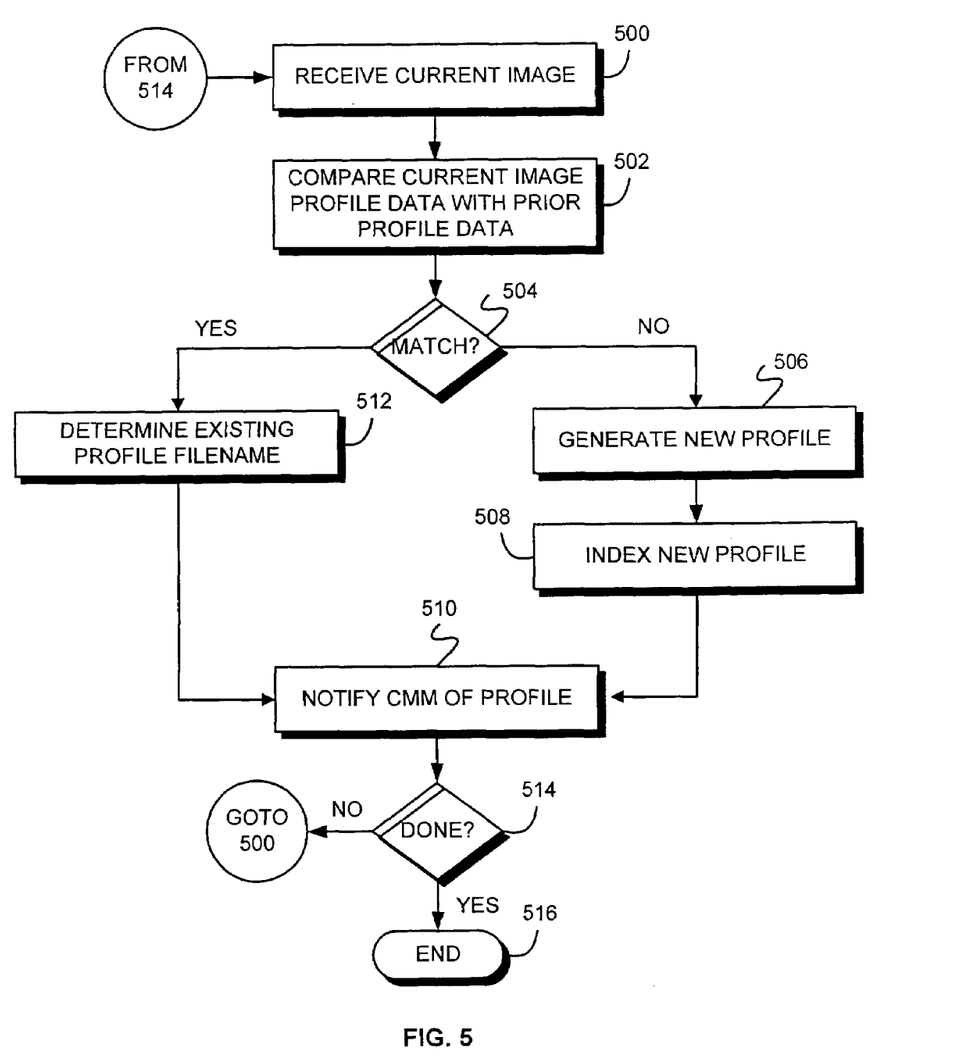
FIG. 5 shows a technique to dynamically create a device profile in accordance with another embodiment of the invention.

Referring to FIG. 5, computer system 200 receives an image file and designates it as the "current" image (step 500). Next, the current image's profile data 300 (see FIG. 3) is compared to that associated with previously transferred profile image data (step 502). In particular, those values associated with profile tags that are subject to change based on changes in capture environment (e.g., redColorantTag, greenColorantTag, blueColorantTag, mediaWhitePointTag, and viewingConditionsTag data values) may be compared to previously transferred tag table data that has been used to create prior profiles (see discussion below and Table 1). These prior profiles may have been created in accordance with FIG. 5. For example, if no prior profiles exist, step 502 may perform no operation and the 'no' prong of step 504 is traversed.

If there is no match (the 'no' prong of step 504), a new profile is generated as described above and assigned a unique filename (step 506). The newly created profile may be indexed in a manner that allows its use with another image (step 508), and the CMM is notified of the new profile's filename via an appropriate applications programming interface (API) call (step 510). In one embodiment, a profile is generated for each unique set of tag table data, and a list/table of the filenames and associated profile information is kept available so that each incoming (i.e., current) image's profile data may be compared to prior unique profile data. In another embodiment, a new profile is generated (step 506) only when the current image's profile information differs from previous profile data by a specified amount. For example, a new profile may be created when the current image's mediaWhitePointTag value differs from a previous profile's mediaWhitePointTag value by a first specified percentage, or when the viewingConditionsTag value differs from a second specified percentage.

If there is a match between the current image's profile data and profile data associated with a previous image (the 'yes' prong of step 504), the filename associated with the matching profile's data is determined (step 512) and provided to the CMM through an appropriate API call (step 510). If the live mode session is complete (the 'yes' prong of step 514), processing is terminated (step 516). If the live mode session is not complete (the 'no' prong of step 514), processing continues at step 500.

Figure 6A:
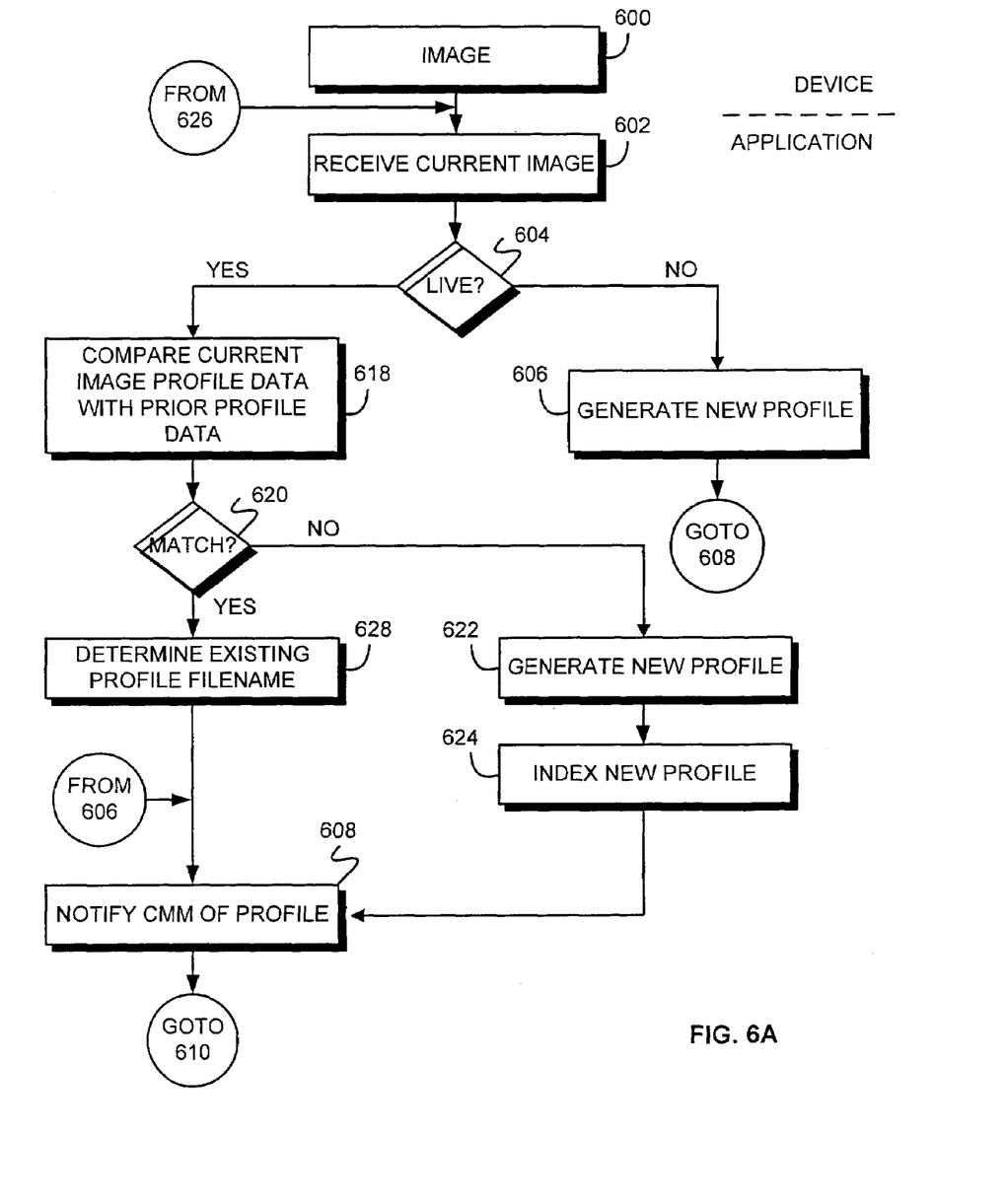
FIGS. 6A and 6B show a technique in accordance with FIGS. 4 and 5.
Figure 6B:
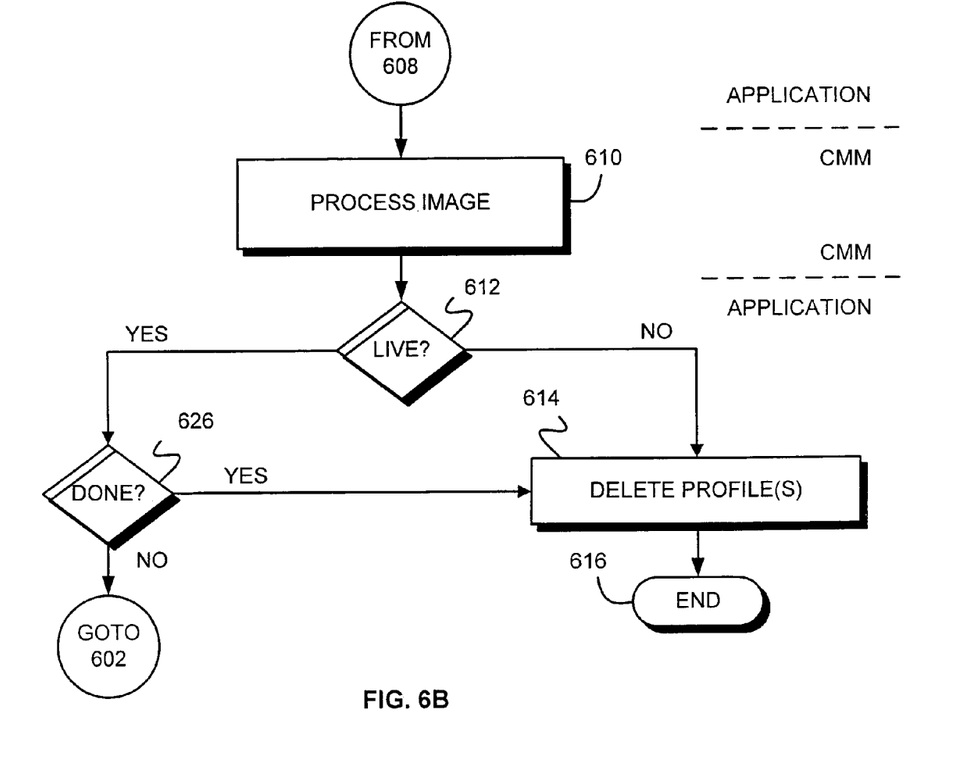

In another embodiment, the ability to distinguish between live mode and non-live mode operations may be provided in a single application (comprising one or more computer programs) as shown in FIGS. 6A and 6B. First, an image may be generated by a digital camera or other suitable device (step 600) and transferred to, and received by, an application program executing on a computer system (step 602). If the imaging device coupled to the computer system is not operating in the live mode (the 'no' prong of step 604), a new profile may be generated (step 606, see also FIG. 5 and associated description). The CMM may then be notified of the image's profile (step 608) which is then processed (step 610). When not operating in the live mode (the 'no' prong of step 612), the just created profile is deleted (step 614) and processing terminates (step 616).

If the imaging device is operating in the live mode (the 'yes' prong of step 604), the received image's profile information is compared with existing (i.e., previously generated and stored) profile data that is subject to change based on the image's capture environment such as changes in illuminant tag values such as mediaWhitePointTag and viewingConditionsTag values, or measurement tag values such as redColorantTag, greenColorantTag, and blueColorantTag values (step 618). If there is no match (the 'no' prong of step 620), a new profile is generated, assigned a unique filename, and indexed as described above and shown in FIG. 5 (steps 622 and 624). After the CMM is notified of the image through appropriate API calls (step 608), it processes the image (step 610). A check may then be made to determine if the live mode session is complete (via the 'yes' prong of step 612). If the live mode is complete (the 'yes' prong of step 626), previously created profiles are deleted (step 614) and processing terminates (step 616). If the live mode is not complete (the 'no' prong of step 626), processing continues at step 602.

If there is a match between the current image's profile information and previous profile data (the 'yes' prong of step 620), that profile associated with the matching profile data is determined (step 628) and processing continues at step 608.

One advantage of dynamically generating device profiles is that each graphical object (e.g., an image) may be rendered as close as possible to its original intent on any device, despite differences in the imaging technologies and color capabilities between the device that captured the graphical object and the device displaying the graphical object. Another advantage of dynamically generated device profiles in accordance with one embodiment of the invention is that existing color management application programs are not required to be modified—they may interact with dynamically generated device profiles via a standard application programming interface. Yet another advantage of dynamically generated profiles is that in live mode the number of profiles needed to accurately process a large number of images may be small. (This is because a camera's capture environment is not likely to change frequently when coupled to a computer system.) In these cases, only a few unique profiles are created (see FIGS. 6A and 6B) and so operational memory requirements (e.g., to store the dynamically generated profiles) and speed (e.g., the time to compare those tag values subject to change) may be small.

Various changes in the materials, components, circuit elements, as well as in the details of the illustrated operational methods are possible without departing from the scope of the claims. For example, an image capture device may be a digital camera or any other device capable of providing an image containing device profile information. Thus, previously captured image files may be provided from computer storage such as magnetic and optical disks, magnetic tape, and flash memory devices. In one embodiment, an image capture device may be coupled to computer system 200 through expansion slots 216 or through I/O circuit 228.

Method steps of FIGS. 4, 5, and 6A and 6B may be performed by a computer processor (e.g., processor 204) executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Further, the methods described herein may be embodied in a hardware device such as a printed circuit board comprising discrete logic, integrated circuits, or specially designed application specific integrated circuits (ASIC).

What is claimed is:

1. A method comprising:
capturing an image in a digital imaging device to form a graphical object;
developing a device profile including information regarding at least one condition of image capture;
forming an image file including the graphical object and said device profile; and
transferring said image file from said imaging device to dynamically generate a profile in a computer system via storing a portion of the device profile in a profile file in a storage of the computer system, the portion comprising an illuminant tag value representative of a color relation between an input color space and a profile color space, associating a filename with the profile file, and communicating the filename to a color management system.

2. The method of claim 1 wherein the illuminant tag value comprises a mediaWhitePointTag value.

3. The method of claim 1 further comprising storing a redColorantTag value and a greenColorantTag value and a blueColorantTag value.

4. The method of claim 1 further comprising forming the image file at the time of image capture.

5. The method of claim 1, wherein the device profile includes information regarding an illuminant condition of the image capture.

6. The method of claim 1, further comprising using an application programming interface of the computer system to communicate the filename.

7. A system comprising:
   a processor; and
   a storage coupled to said processor, said storage storing instructions that, if executed, enable the system to dynamically generate a profile via storage of a portion of a device profile transferred from a digital imaging device along with an image file, in a profile file in a storage of the system, the portion comprising an illuminant tag value representative of a color relation between an input color space and a profile color space, to associate a filename with the profile file, and to communicate the filename to a color management system.

8. The system of claim 7 wherein the system comprises a computer system coupled to the digital imaging device.

9. The system of claim 7 wherein said storage to store instructions that, if executed, enable the system to store a redColorantTag value and a greenColorantTag value and a blueColorantTag value.

10. A method comprising:
    receiving a first file having image data and device profile information from an imaging device; and
    comparing at least an illuminant tag value portion of the device profile information to at least an illuminant tag value portion of prior received device profile information of a second file having prior received image data and the prior received device profile information and, based on the comparison, generating a current device profile for the first file for use in a color management system.

11. The method of claim 10, wherein the current device profile comprises at least a portion of the device profile information.

12. The method of claim 10, wherein the current device profile comprises at least a portion of the prior received device profile information.

13. The method of claim 10, wherein the illuminant tag value portion comprises a mediaWhitePointTag value.

14. The method of claim 10, wherein the illuminant tag value portion comprises an illuminant condition of capture of the image data.

15. The method of claim 10, wherein generating the current device profile comprises:
    if the comparison is indicative of no match between the device profile information and the prior received device profile information, generating a profile based on the device profile information;
    identifying the profile to the color management system; and
    storing the generated profile.

16. The method of claim 10, wherein generating the current device profile comprises:
    determining if the illuminant tag value portion of the device profile information and the illuminant tag value portion of the prior received device profile information match within a specified amount.

17. The method of claim 16, further comprising using the prior received device profile information for the current device profile if there is a match within the specified amount.

18. The method of claim 10, further comprising:
    using the prior received device profile information for the current device profile if the comparison is indicative of a match between the illuminant tag value portion of the device profile information and the illuminant tag value portion of the prior received device profile information; and
    associating the first file with the prior received device profile information.

19. The method of claim 10, further comprising associating the prior received device profile information with a plurality of files including image data and device profile information based on the comparing.

* * * * *